United States Patent
Chiang et al.

(10) Patent No.: US 9,639,684 B2
(45) Date of Patent: May 2, 2017

(54) REMOTE CONTROL METHOD WITH IDENTITY VERIFICATION MECHANISM AND WEARABLE DEVICE FOR PERFORMING THE METHOD

(71) Applicant: PEGATRON CORPORATION, Taipei (TW)

(72) Inventors: Wen-Ham Chiang, Taipei (TW); Yu-Chang Chen, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 45 days.

(21) Appl. No.: 14/698,411

(22) Filed: Apr. 28, 2015

(65) Prior Publication Data

US 2015/0324567 A1 Nov. 12, 2015

(30) Foreign Application Priority Data

May 6, 2014 (TW) .............................. 103116060 A

(51) Int. Cl.
| | |
|---|---|
| G06F 21/32 | (2013.01) |
| G06F 21/44 | (2013.01) |
| H04W 12/06 | (2009.01) |
| H04L 29/06 | (2006.01) |
| H04W 4/00 | (2009.01) |

(52) U.S. Cl.
CPC .............. *G06F 21/32* (2013.01); *G06F 21/44* (2013.01); *H04L 63/0861* (2013.01); *H04W 4/008* (2013.01); *H04W 12/06* (2013.01)

(58) Field of Classification Search
CPC ..... G06F 21/32; G06F 21/44; H04L 63/0861; H04L 67/12; H04W 4/008; H04W 12/06; G02B 27/017; G02B 2027/0178; G06K 9/00617
See application file for complete search history.

(56) References Cited

U.S. PATENT DOCUMENTS

| | | | | |
|---|---|---|---|---|
| 8,825,021 B2* | 9/2014 | Wang | .................. | H04W 4/02 340/5.2 |
| 2006/0115130 A1* | 6/2006 | Kozlay | .............. | G02B 27/0093 382/117 |
| 2012/0280790 A1* | 11/2012 | Gerhardt | ............ | G07C 9/00309 340/5.61 |
| 2013/0070924 A1* | 3/2013 | Bertin | ................ | H04N 13/0497 380/211 |

(Continued)

FOREIGN PATENT DOCUMENTS

| | | |
|---|---|---|
| CN | 103236094 A | 8/2013 |
| CN | 103310142 A | 9/2013 |

(Continued)

*Primary Examiner* — An T Nguyen
(74) *Attorney, Agent, or Firm* — Muncy, Geissler, Olds & Lowe, P.C.

(57) ABSTRACT

A remote control method with identity verification mechanism is suited for a wearable device. The remote control method includes the following steps. Detecting whether the wearable device is close to a target device within a specific distance is performed. If the wearable device is close to the target device within the specific distance, a fingerprint data inputted by the user is obtained from the wearable device and determined whether the fingerprint data matches a predetermined fingerprint data. If yes, a control command is sent to the target device.

6 Claims, 4 Drawing Sheets

(56) References Cited

U.S. PATENT DOCUMENTS

| | | | | |
|---|---|---|---|---|
| 2013/0095802 A1* | 4/2013 | Wang | ................ | H04W 4/02 455/414.1 |
| 2013/0257590 A1* | 10/2013 | Kuenzi | ................ | G05B 1/01 340/5.65 |
| 2014/0266639 A1* | 9/2014 | Zises | ................ | G08C 17/02 340/12.28 |
| 2014/0341441 A1* | 11/2014 | Slaby | ................ | G06F 21/32 382/117 |
| 2014/0375422 A1* | 12/2014 | Huber | ................ | G07C 9/00174 340/5.61 |
| 2015/0067346 A1* | 3/2015 | Ross | ................ | G06K 9/3216 713/176 |
| 2015/0156196 A1* | 6/2015 | Kim | ................ | G06F 21/32 345/156 |
| 2015/0263806 A1* | 9/2015 | Puscasu | ................ | F41H 1/00 398/130 |
| 2015/0271175 A1* | 9/2015 | Je | ................ | H04L 63/0861 726/4 |
| 2015/0324567 A1* | 11/2015 | Chiang | ................ | H04L 63/0861 340/5.83 |
| 2016/0057565 A1* | 2/2016 | Gold | ................ | H04W 4/008 455/41.1 |
| 2016/0099938 A1* | 4/2016 | Seo | ................ | H04L 63/0853 713/169 |
| 2016/0180618 A1* | 6/2016 | Ho | ................ | G07C 9/00571 340/5.52 |

FOREIGN PATENT DOCUMENTS

| | | | |
|---|---|---|---|
| CN | 103378876 A | 10/2013 | |
| TW | I233960 B | 6/2005 | |
| TW | M435107 U | 8/2012 | |

* cited by examiner

REMOTE CONTROL METHOD WITH IDENTITY VERIFICATION MECHANISM AND WEARABLE DEVICE FOR PERFORMING THE METHOD

CROSS-REFERENCE TO RELATED APPLICATIONS

This Non-provisional application claims priority under 35 U.S.C. §119(a) on Patent Application No(s). 103116060 filed in Taiwan, Republic of China on May 6, 2014, the entire contents of which are hereby incorporated by reference.

BACKGROUND

Technology Field

This invention relates to a remote control method and, more particularly, to a remote control method with dual identity verification mechanism.

Description of the Related Art

As the developing technology, an electronic surveillance device is continually promoting. The early electronic surveillance mechanism recognizes the identity by inputting the specific password. However, the password needs to be mesmerized and will be decoded easily. Thus, a identity verification system for recognizing physiological characteristics has been invented recently, such as a system of fingerprint recognition, iris recognition, face recognition and so on.

However, no matter which kind of system for recognizing characteristics, such as fingerprint recognition, iris recognition or face recognition, most of them are located on or near a fixed position of the object to be unlocked. For example, the system for recognizing characteristics of the door lock will be located near the door. When the user is close to the door, the system for recognizing characteristics will capture the physiological characteristics of the user for determination in order to determine if the user has the authorization of the entrance or not. However, the system for recognizing characteristics will have potential to be unlocked be other person when it is located on the fixed position. Therefore if the system for recognizing characteristics can be portable, the risk of the unlock potential will be decreased dramatically.

SUMMARY

A main aspect of the present disclosure is to provide a remote control method with identity verification mechanism.

Another aspect of the present disclosure is to provide a wearable device for performing the abovementioned remote control method.

To achieve the abovementioned purpose, the remote control method with identity verification mechanism of the present disclosure is suited for a wearable device to allow a user to remotely control a target device through the wearable device. The remote control method of the present disclosure comprises the following steps of: detecting whether the wearable device is close to the target device within a specific distance; if the wearable device is close to the target device within the specific distance, obtaining a fingerprint data inputted by the user from the wearable device and determining whether the fingerprint data matches a predetermined fingerprint data; and if the fingerprint data matches the predetermined fingerprint data, sending a control command to the target device to allow the target device to be turned on or operated according to the control command.

The present disclosure further provides a wearable device. The wearable device is provided for remotely controlling a target device and comprises a wireless communication module, a fingerprint sensor module and a control unit. The wireless communication module is provided for detecting whether the wearable device is close to the target device within a specific distance. The fingerprint sensor module is provided for sensing a fingerprint data when the wearable device is close to the target device within the specific distance. The control unit is electrically connected with the wireless communication module and the fingerprint sensor module and is provided for determining whether the fingerprint data matches a predetermined fingerprint data. When the fingerprint data matches the predetermined fingerprint data, a control command is sent and transmitted to the target device through the wireless communication module.

DETAILED DESCRIPTION OF THE INVENTION

To allow Examiner to further understand the technical concept of the present invention, a preferred embodiment is described as follows.

Figure 1:
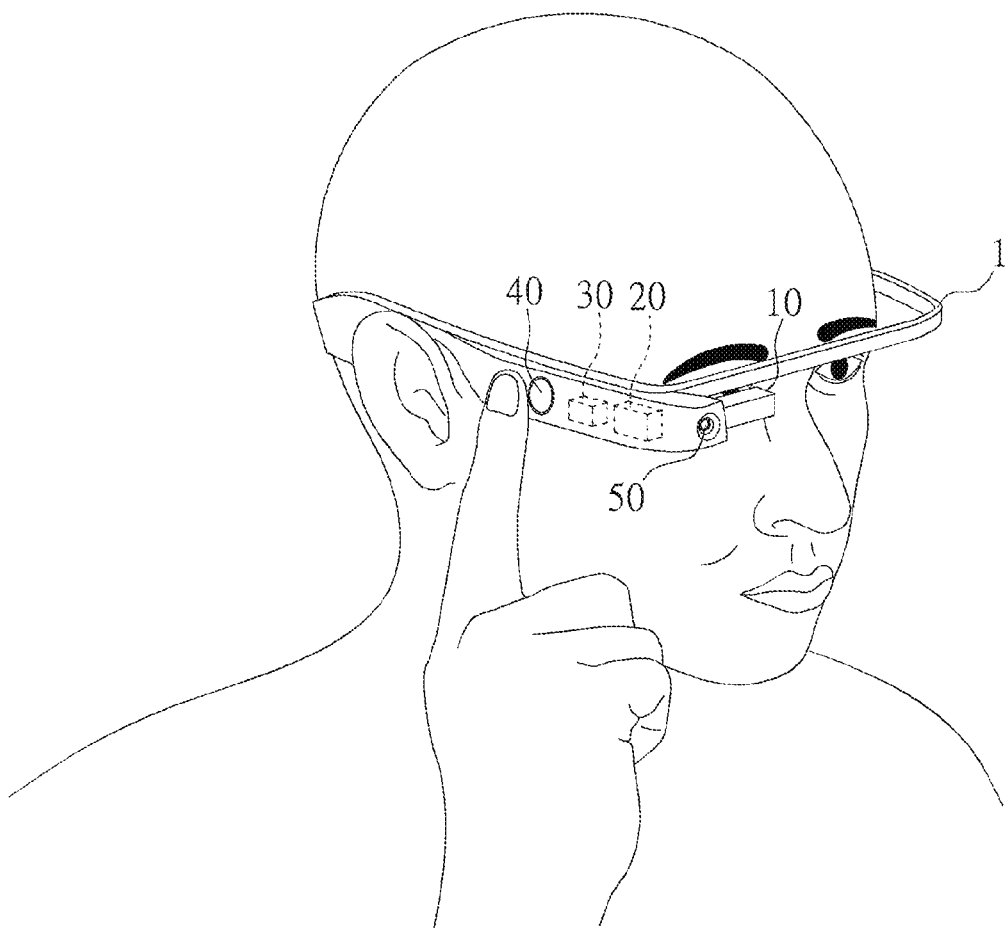
FIG. 1 is an outline schematic drawing showing a wearable device according to an embodiment of the present invention.
Figure 2:
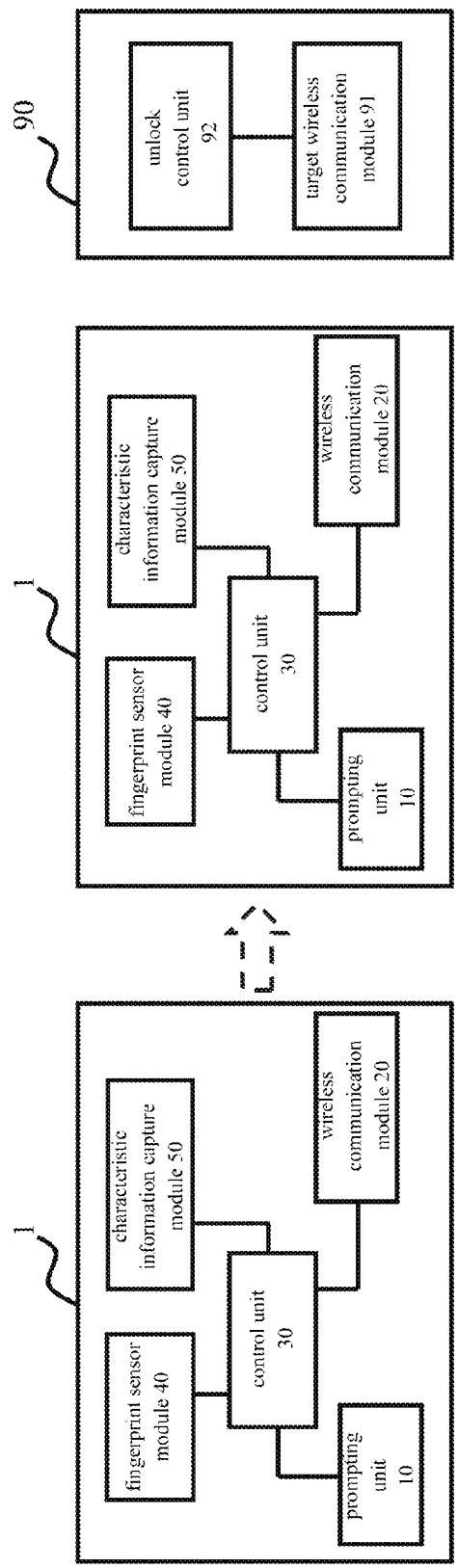
FIG. 2 is a drawing showing an implementation structure of a wearable device and a target device according to the embodiment of the present invention.
Figure 3:
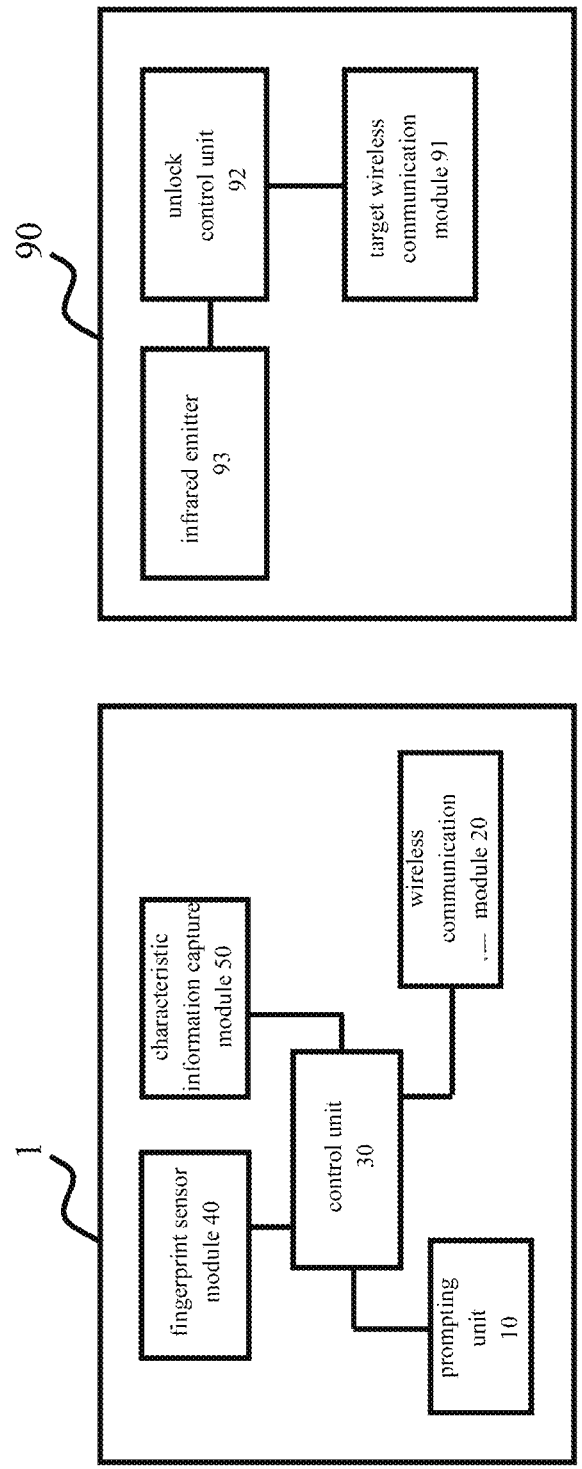
FIG. 3 is a drawing showing another implementation structure of a wearable device and a target device according to the embodiment of the present invention.

Please refer to FIG. 1 in conjunction with FIG. 3. FIG. 1 is an outline schematic drawing showing a wearable device according to an embodiment of the present invention, FIG. 2 is a drawing showing an implementation structure of a wearable device and a target device according to the present invention, and FIG. 3 is a drawing showing another implementation structure of a wearable device and a target device according to the present invention.

As shown in FIG. 1, in the embodiment of the present invention, the wearable device 1 of the embodiment is smart glasses. However, the wearable device 1 of the present invention is not limited thereto and is able to be a smart watch or other wearable electronic device. As shown in FIG. 2, the wearable device 1 of the present invention is provided for remotely control a target device 90. In an embodiment of the present invention, the target device 90 comprises a target wireless communication module 91 and an unlock control unit 92, in which the target wireless communication module 91 can be a Bluetooth communication device, and the unlock control unit 92 can be a microcontroller. However, the present invention is not limited thereto. In the embodiment of the present invention, the target device 90 can be an electronic lock, a lamp or a computing device. However, the present invention is not limited thereto.

As shown in FIG. 1 and FIG. 2, in the embodiment of the present invention, the wearable device 1 comprises a prompting unit 10, a wireless communication module 20, a control unit 30, a fingerprint sensor module 40 and characteristic information capture module 50.

In the embodiment of the present invention, the prompting unit 10 is a display. The prompting unit 10 is provided for sending a prompting message in video way and display the relative information, such as web information, time information and so on, for user. However, the prompting unit 10 is not limited to the display and also can be a buzzer or other device having the prompting function.

In the embodiment of the present invention, the wireless communication module 20 is a Bluetooth communication device for telecommunication with the target wireless communication module 91. However, the wireless communication module 20 of the present invention is not limited to the Bluetooth communication device. The wireless communication module 20 and the target wireless communication module 91 also can be infrared communication devices, wireless network communication devices or other electronic devices capable of performing the wireless communication. The wireless communication module 20 is provided for detecting whether the wearable device is close to the target device 90 within a specific distance and sending a notice signal to the control unit 30 when the wearable device is close to the target device 90 within the specific distance. Utilizing the Bluetooth communication device to detect another Bluetooth communication device and how to execute the telecommunication between the two devices are prior art. Therefore, there is no need for further description.

In the embodiment of the present invention, the control unit 30 is electrically connected with the wireless communication module 20 and the prompting unit 10. After the control unit 30 receives the notice signal transmitted from the wireless communication module 20, that is, when the wearable device 1 is close to the target device 90 within the specific distance, the control unit 30 is provided for controlling the prompting unit 10 to send the prompting message for prompting the user of the wearable device 1 to input fingerprint data. In the embodiment of the present invention, the prompting message is prompted through the display. For example, the display displays words "please input fingerprint" to inform the user that the target device 90 has been within the specific distance range and remind the user to input the fingerprint data. In an embodiment of the present invention, the control unit 30 is composed of one or more microcontrollers installed with specific soft program for executing the relative control. However, the control unit 30 of the present invention is not limited to the microcontroller.

In the embodiment of the present invention, the fingerprint sensor module 40 is electrically connected with the control unit 30 for sensing the fingerprint data of the user. The control unit 30 can perform the relative control of the fingerprint recognition by installing and executing the specific software, and more precisely, the control unit 30 is combined with the fingerprint sensor module 40 to form a fingerprint recognition system in the embodiment of the present invention. After the fingerprint sensor module 40 senses the fingerprint data, the control unit 30 can determine whether the fingerprint data matches a predetermined fingerprint data according to the obtained fingerprint data and sends a control command to allow the control command to be transmitted to the target device 90 through the wireless communication module 20 when the fingerprint data matches the predetermined fingerprint data.

In the embodiment of the present invention, the characteristic information capture module 50 is a camera. The characteristic information capture module 50 is electrically connected with the control unit 30 for sensing the characteristic information of the target device 90 and transmitting the characteristic information to the control unit 30 after obtaining the characteristic information. The control unit 30 will determine whether the obtained characteristic information matches predetermined characteristic information after receiving the characteristic information. When it determines that the obtained characteristic information matches the predetermined characteristic information and after the abovementioned fingerprint recognition mechanism is passed, the control unit will send the abovementioned control command to the target device 90 according to the obtained characteristic information.

In an embodiment of the present invention, the characteristic information is image information of the target device 90. That is, when the camera obtains the image of the target device 90, the control unit 30 will perform an image recognition task according to the obtained image information and determine whether the obtained image information matches the image information pre-stored in the wearable device 1 (that is, the predetermined characteristic information) by the means of comparison. When the obtained image information matches the image information pre-stored in the wearable device 1, the corresponding control command is sent according to the predetermined characteristic information. The image recognition technology is well known so that there is no need for further description.

As shown in FIG. 3, in another embodiment of the present invention, the target device 90 further comprises an infrared emitter 93. Different target devices 90 can emit infrared beams having different frequencies. For example, the frequency of the infrared beam emitted from the infrared emitter 93 of the electronic lock is ranged from 300 GHz to 3 THz, the frequency of the infrared beam emitted from the infrared emitter 93 of the lamp is ranged from 3 THz to 30 THz and the frequency of the infrared beam emitted from the computing device is ranged from 30 THz to 300 THz. Therefore, in such the embodiment, the characteristic information is the infrared beam having the specific frequency emitted from the target device 90. In the meanwhile, the control unit 30 recognizes the characteristic information by determining the magnitude of the frequency of the infrared beam.

Figure 4:
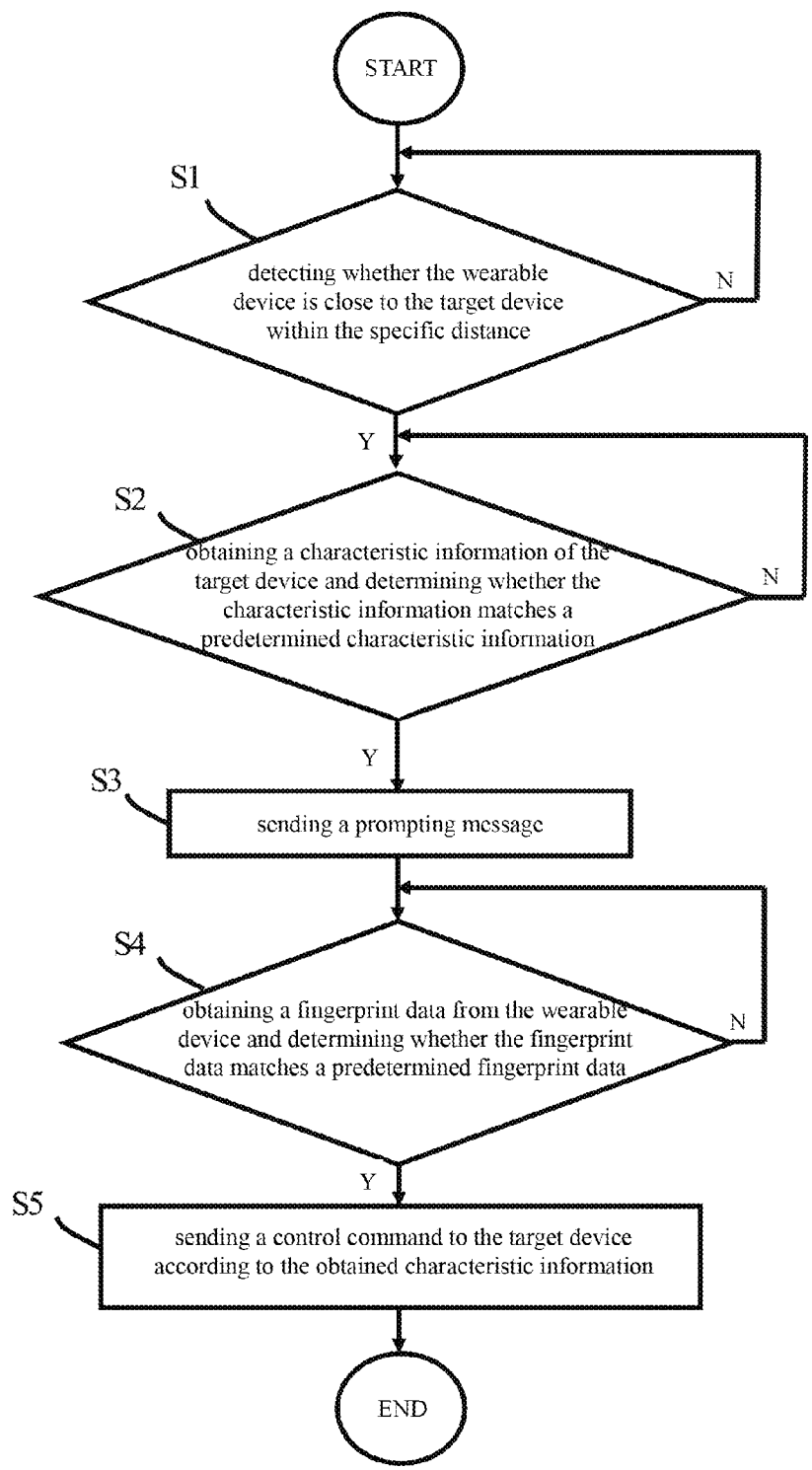
FIG. 4 is a flow chart of a remote control method according to the present invention.

In the following, please refer to FIG. 4 in conjunction with FIG. 2 and FIG. 3 for understanding the detailed steps of the remote control method with identity verification mechanism according to the present invention, in which FIG. 4 is a flow chart of a remote control method according to the present invention. Note that the present method is not limited to the abovementioned wearable device 1, although the following remote control method disclosed in the preset invention takes the abovementioned wearable device 1 as an example.

First, step S1: detecting whether the wearable device is close to the target device within the specific distance.

As shown in FIG. 1, when the wearable device 1, which is outside the specific distance, is close to the target device 90 within the specific distance, the wireless communication module 20 and the target wireless communication module 91 will sense with each other. That is, the wireless communication module 20 is capable of detecting whether the wearable device 1 is close to the target device 90 within the specific distance through the abovementioned mechanism. Relatively, the target wireless communication module 91 also can detect whether the wearable device 1 is close to the target device 90 within the specific distance.

Step S2: obtaining characteristic information of the target device and determining whether the characteristic information matches predetermined characteristic information.

As shown in FIG. 2, in an embodiment of the present invention, that is, in the embodiment which the characteristic information is the image information, when the wireless communication module 20 detects that the wearable device 1 is close to the target device 90 within the specific distance, the wireless communication module 20 will send a notice signal to the control unit 30 to allow the control unit 30 to control the characteristic information capture module 50 (it is a camera in the present embodiment) according to the notice signal for sensing the image information (that is, the characteristic information) of the target device 90. When the user uses the camera lens to aim at the target device, the camera can sense the image information of the target device 90. After obtaining the characteristic information, the control unit 30 further recognizes and determines whether the obtained characteristic information matches the predetermined characteristic information stored in the wearable device 1. For example, it supposes that the database of the wearable device 1 (not shown in the figure) stores the image information of the electronic lock and the lamp. When the characteristic information capture module 50 senses certain image information, the control unit 30 will utilize image recognition technology to determine the certain image information is the image information of the electronic lock, the lamp, the computing device or other object and compare with the image information in the database (that is, the predetermined characteristic information) for determining whether the obtained image information matches the image information stored in the database. That is, it determines whether the obtained characteristic information matches the predetermined characteristic information or not.

As shown in FIG. 3, in another embodiment of the present invention, that is, in the embodiment which the characteristic information is an infrared beam having a specific frequency emitted from the target device 90, when the wearable device 1 is close to the target device 90 within the specific distance, the target wireless communication module 91 also informs the unlock control unit 92 through transmitting the signal to control the infrared emitter 93 to emit the infrared beam having the specific frequency except the wireless communication module 20 will inform the control unit 30 to control the characteristic information capture module 50 to sense the characteristic information. At that time, the user uses the camera lens to aim at the infrared emitter 93 so as to sense the characteristic information. After obtaining the characteristic information, the control unit 30 further recognizes and determines whether the obtained characteristic information matches the predetermined characteristic information stored in the wearable device 1. For example, it supposes that the database of the wearable device 1 (not shown in the figure) stores the frequency information of the infrared beams emitted from the infrared emitter 93 of the electronic lock and the lamp. When the characteristic information capture module 50 senses the infrared beam having certain specific frequency, the control unit 30 will determine what the specific frequency of the infrared beam is and compare with the frequency information in the database (that is, the predetermined characteristic information) for determining whether the value of the frequency of the obtained infrared beam matches the value of the frequency stored in the database. That is, it determines whether the obtained characteristic information matches the predetermined characteristic information or not.

Step S3: sending a prompting message.

In the embodiment of the present invention, the control unit 30 controls the prompting unit 10 to send the prompting message for prompting the user to input the fingerprint data when the step S2 is completed and it determined that the characteristic information matches the predetermined characteristic information.

Step S4: obtaining the fingerprint data from the wearable device and determining whether the fingerprint data matches a predetermined fingerprint data.

After the step S3 is completed, the fingerprint sensor module 40 will sense the fingerprint data of the user if the user inputs the fingerprint data through the fingerprint sensor nodule 40. After obtaining the fingerprint data, the control unit 30 will then determine whether the obtained fingerprint data matches the predetermined fingerprint data stored in the wearable device 1 by the means of comparison according to the obtained fingerprint for verifying whether the user has authority for using the wearable device 1.

Step S5: sending a control command to the target device according to the obtained characteristic information.

When the control unit 30 determines that the fingerprint data inputted by the user indeed matches the predetermined fingerprint data, the control unit 30 will then send the corresponding control command according to the characteristic information obtained previously and allow the control command to be transmitted to the target device 90 through the wireless communication module 20. For example, when the user with the wearable device 1 is close to the electronic lock and the lamp, which are remote controlled by the wearable device 1, within the specific distance at the same time (that is, the user is close to two target devices 90 within the specific distance at the same time), the user uses the camera (the characteristic information capture module 50) to aim at the electronic lock and allows the camera to sense the characteristic information of the electronic lock. Once the step S4 is completed and it determines that the fingerprint data inputted by the user matches the predetermined fingerprint data, the control unit 30 will send the corresponding control command, which is only able to control the electronic lock, according to the obtained characteristic information. That is, such the control command only can control the electronic lock to be unlocked or locked and cannot allow the lamp, which is also within the specific distance, to be turned on or turned off for avoiding the two target devices 90 from being triggered at the same time. On the other hand, if the obtained fingerprint data in the step S2 is the fingerprint data of the lamp, the control command sent at that time is provided for controlling the lamp and cannot control the electronic lock.

After the control command is transmitted to the target device 90 through the wireless communication module 20, the target device 90 will perform the corresponding action according to the control command. For example, the electronic lock will perform an unlocking action after receiving the control command, the lamp will be turned on after receiving the control command, and the computing device will perform an action to allow the user to log in after receiving the control command.

Note that the remote control method of the present invention is not limited to the abovementioned order. The above order of the steps also can be changed as long as the purpose of the present invention can be achieved. For example, the step S3 is unnecessary. The implement of the prompting action is not necessary to be performed by the wearable device 1 and the target device 90 also can perform a prompting action to prompt the user so as to omit the step S3. For example, the user also can utilize the characteristic information capture module 50 to obtain the characteristic information and then utilize the wireless communication module 20 to detect whether the wearable device 1 is close to the target device 90 within the specific distance. That is, the step S1 and the step S2 can be exchanged.

According to the above description, it is known that the wearable device 1 utilizes the sense between the wireless communication module 20 and the target wireless communication module 91 of the target device 90 to be a first verification (the two wireless communication modules need to be paired first so as to sense with each other) and further utilizes the fingerprint to be a second verification for ensuring the user who currently wears the wearable device 1 is a true user who has authority to use the wearable device 1. Because the fingerprint recognition system is disposed on the wearable device 1 and is portable by the user, the risk of being cracked will be reduced.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A remote control method with identity verification mechanism suited for a wearable device to allow a user to remotely control a target device through the wearable device, comprising:
   detecting whether the wearable device is close to the target device within a specific distance;
   if the wearable device is within specified distance of the target device, performing these steps of:
   obtaining a characteristic information of the target device and determining whether the characteristic information matches a predetermined characteristic information, wherein the characteristic information is an infrared beam having a specific frequency emitted from the target device so as to be recognized by determining the specific frequency;
   obtaining a fingerprint data inputted by the user from the wearable device and determining whether the fingerprint data matches a predetermined fingerprint data; and
   sending a control command from the wearable device to the target device according to the characteristic information when the characteristic information matches the predetermined characteristic information and the fingerprint data matches the predetermined fingerprint data.

2. The remote control method according to claim 1, before obtaining the fingerprint data, further comprising: sending a prompting message for prompting the user to input the fingerprint data.

3. The remote control method according to claim 1, wherein the wearable device is smart glasses.

4. A wearable device for a user to remotely control a target device through thereof, comprising:
   a wireless communication module provided for detecting whether the wearable device is close to the target device within a specific distance;
   a characteristic information capture module provided for sensing a characteristic information of the target device, wherein the characteristic information is an infrared beam having a specific frequency emitted from the target device so as to be recognized by determining the specific frequency;
   a fingerprint sensor module provided for sensing a fingerprint data when the wearable device is close to the target device within the specific distance; and
   a control unit electrically connected with the wireless communication module, the characteristic information capture module and the fingerprint sensor module for determining whether the characteristic information matches a predetermined characteristic information and whether the fingerprint data matches a predetermined fingerprint data, and sending a control command according to the characteristic information when the characteristic information matches the predetermined characteristic information and the fingerprint data matches the predetermined fingerprint data, wherein the control command is transmitted to the target device through the wireless communication module.

5. The wearable device according to claim 4, further comprising a prompting unit electrically connected with the control unit for sending a prompting message before the fingerprint sensor module senses the fingerprint data for prompting the user to input the fingerprint data.

6. The wearable device according to claim 4, wherein the wearable device smart glasses.

* * * * *